United States Patent
Ronen et al.

(10) Patent No.: US 9,635,570 B2
(45) Date of Patent: Apr. 25, 2017

(54) MOBILE APPLICATION PERFORMANCE PREDICTION

(71) Applicant: Google Inc., Mountain View, CA (US)

(72) Inventors: Ofer Ronen, Dublin, CA (US); Keith Simmons, Redwood City, CA (US)

(73) Assignee: Google Inc., Mountain View, CA (US)

( * ) Notice: Subject to any disclaimer, the term of this patent is extended or adjusted under 35 U.S.C. 154(b) by 210 days.

(21) Appl. No.: 14/243,783

(22) Filed: Apr. 2, 2014

(65) Prior Publication Data
US 2014/0302837 A1    Oct. 9, 2014

Related U.S. Application Data

(60) Provisional application No. 61/853,379, filed on Apr. 4, 2013.

(51) Int. Cl.
*H04W 24/08* (2009.01)
*G06F 11/36* (2006.01)
*H04W 24/04* (2009.01)
*H04W 4/00* (2009.01)

(52) U.S. Cl.
CPC ............ *H04W 24/08* (2013.01); *G06F 11/36* (2013.01); *H04W 4/001* (2013.01); *H04W 24/04* (2013.01)

(58) Field of Classification Search
CPC ........ H04W 24/08; H04W 4/001; G06F 11/36
USPC ................................................ 455/418–420
See application file for complete search history.

(56) References Cited

U.S. PATENT DOCUMENTS

| | | | | |
|---|---|---|---|---|
| 5,655,074 | A * | 8/1997 | Rauscher | G06F 11/3616 702/179 |
| 2011/0111799 | A1* | 5/2011 | Kothari | H04W 52/0261 455/556.2 |
| 2011/0145920 | A1* | 6/2011 | Mahaffey | G06F 21/564 726/22 |
| 2012/0036498 | A1* | 2/2012 | Akirekadu | G06F 11/3495 717/124 |
| 2012/0207035 | A1* | 8/2012 | Simha | H04L 41/5035 370/252 |

\* cited by examiner

*Primary Examiner* — Erica Navar
(74) *Attorney, Agent, or Firm* — Wolfe-SBMC

(57) ABSTRACT

The present invention provides methods of and systems for predicting performance of a mobile application. A first mobile application is installed on a first plurality of wireless mobile devices. Operational data resulting from operating the first mobile application on the first plurality of mobile devices is collected. A second mobile application is installed on a second plurality of mobile devices. Test data resulting from operating the second the mobile application on the second plurality of mobile devices is collected. The performance of the second mobile application is predicted using the operational data and the test data for combinations of mobile device configuration and wireless network connection type not represented by the second plurality of mobile devices.

24 Claims, 7 Drawing Sheets

MOBILE APPLICATION PERFORMANCE PREDICTION

This application claims the benefit of U.S. Provisional Application No. 61/853,379, filed Apr. 4, 2013, the entire contents of which are hereby incorporated by reference.

BACKGROUND OF THE INVENTION

The present invention relates to the field of wireless mobile devices and software applications installed thereon. More particularly, the present invention relates to predicting performance of such devices and software applications.

According to a study by Flurry individuals in the United States used mobile applications for 127 minutes a day during the month of December 2012, which was 35% more than a year earlier. Nonetheless when mobile application developers develop a new application or a new version of an application there are limited tools for predicting the performance before an application is released to a wide audience.

There are tools available, like Apple's Instruments, which provide performance information in a controlled development environment. Such tools do not anticipate the various environments that the application might run in, such as limited cellular networks, handsets with limited memory, or operating system versions with features limiting performance. A partial solution then is to use a mobile testing solution, like the one from Keynote Systems, which provide a panel of testers with mobile devices to test performance. The limitation of these solutions is that they use a sample of the total population of mobile users; therefore they cannot do an exhaustive job of providing performance for the thousands of configurations among end users including varying geographies, network connections, mobile devices, mobile application characteristics, and operating system versions. Also for a given configuration these solutions have data that is limited by the size of the panel.

Thus there is a need for a solution that predicts the performance of mobile applications for an exhaustive list of possible end user conditions and application characteristics. Also there is a need for a solution that leverages more than just the limited data provided by a sample panel to predict mobile application performance.

SUMMARY OF THE INVENTION

The present invention provides methods of and systems for predicting performance of a mobile application. In accordance with an embodiment, a first mobile application is installed on a first plurality of wireless mobile devices, the first plurality of mobile devices including disparate mobile device configurations and wireless network connection types. Operational data resulting from operating the first mobile application on the first plurality of mobile devices is collected, the operational data representing performance of the first mobile application for each of a plurality of combinations of mobile device configuration and wireless network connection type. A second mobile application is installed on a second plurality of mobile devices, the second plurality of mobile devices including disparate mobile device configurations and wireless network connection types. Test data resulting from operating the second mobile application on the second plurality of mobile devices is collected, the test data representing performance of the second application for each of a plurality of combinations of mobile device configuration and wireless network connection type, the second plurality of mobile devices being a smaller set than the first plurality of mobile devices. The performance of the second mobile application is predicted using the operational data and the test data for combinations of mobile device configuration and wireless network connection type not represented by the second plurality of mobile devices.

BRIEF DESCRIPTION OF THE DRAWINGS

The present invention is described with respect to particular exemplary embodiments thereof and reference is accordingly made to the drawings in which.

DETAILED DESCRIPTION OF A PREFERRED EMBODIMENT OF THE INVENTION

A mobile phone implemented method, system, and program product for mobile application performance prediction provides an estimate of application performance for a second group of mobile phone application users, including processor, memory, battery, and network performance, given performance characteristics of the mobile application in a first group of mobile phone application users. In accordance with an embodiment, the invention samples performance of the second group of mobile phone application users and then uses historical data from a first group using other applications or other versions of the same application to make performance predictions for the application for the second group. Performance predictions are made for various combinations of operating system versions, mobile devices, network connections, and geography.

The first group of users is typically provided with a production version of a mobile application, whereas, the second group of users may be provided with a version of a mobile application that is under test. Accordingly, the first group of users is generally larger than the second group of users and the production data (also referred to as "historical data" or "operational data") collected from the first group is therefore typically larger and more comprehensive than the data (also referred to as "test" data) collected from the second group. Embodiments of the present invention facilitate testing of the mobile application under test by making predictions about its performance before the application is released to a wide audience. As described in more detail herein, predictions about the mobile application under test are made using the larger data set collected from the production mobile application as well as the smaller data set collected from the mobile application under test.

Figure 1:
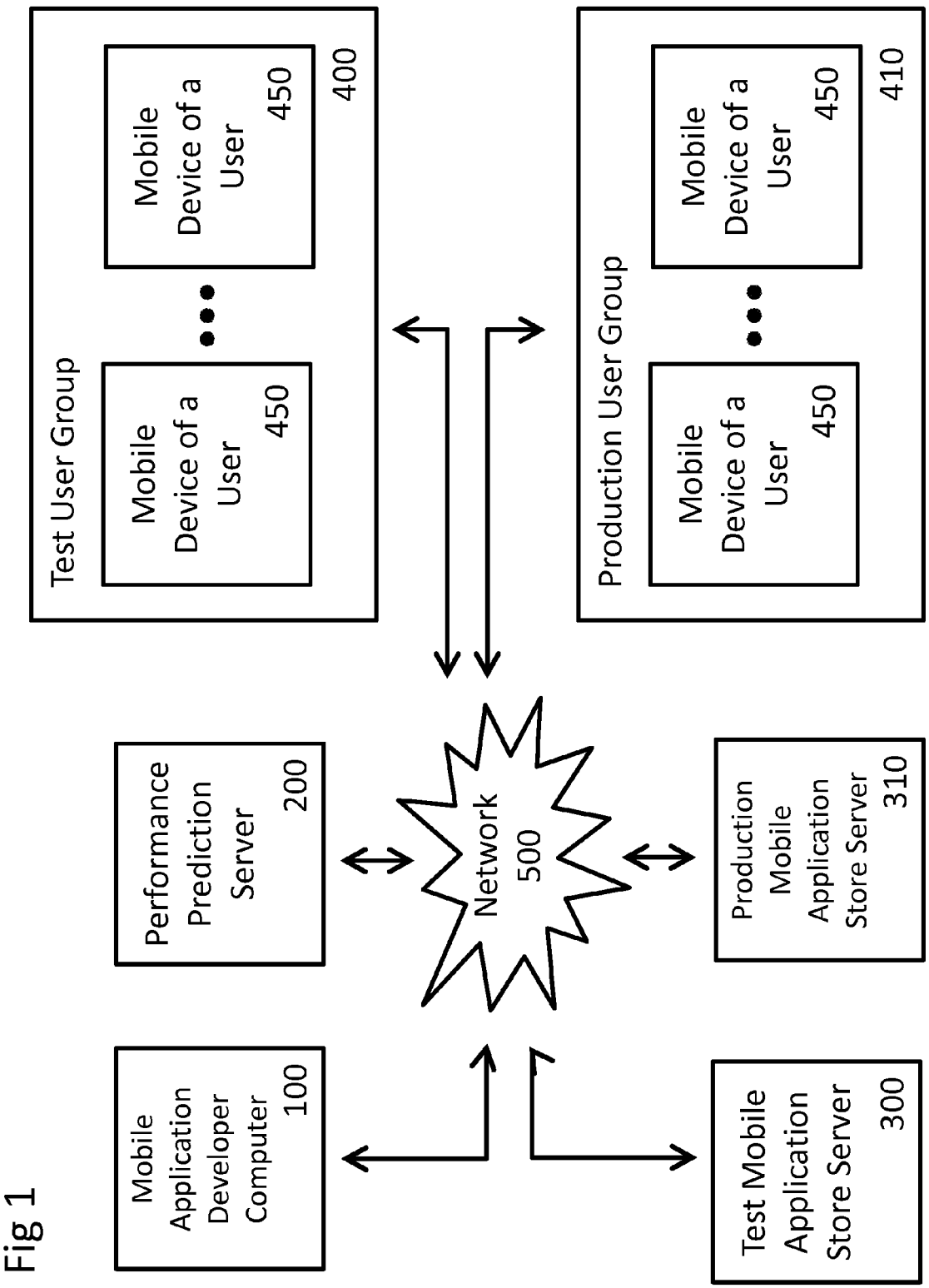
FIG. 1 illustrates the system for predicting mobile application performance that includes a mobile application developer computer, performance prediction server, test mobile application store server, production mobile application store server, test user group, production user group, and mobile devices.

FIG. 1 illustrates a mobile application developer 100 using a personal computer to access a performance prediction server 200 over a network 500 such as the Internet. The developer 100 downloads a performance library and then includes and instantiates the performance library in their mobile application. The application developer 100 can upload over a network 500 to a test mobile application store server 300 or production mobile application store server 310 the application with the performance library included. A mobile device user 450 connects over a network 500 such as a Wi-Fi network or cellular network to the test mobile application store server 300 or production mobile application store server 310 to download the application. The mobile device 450 then connects to the performance prediction server 200 to send application performance data that is collected.

Figure 2:
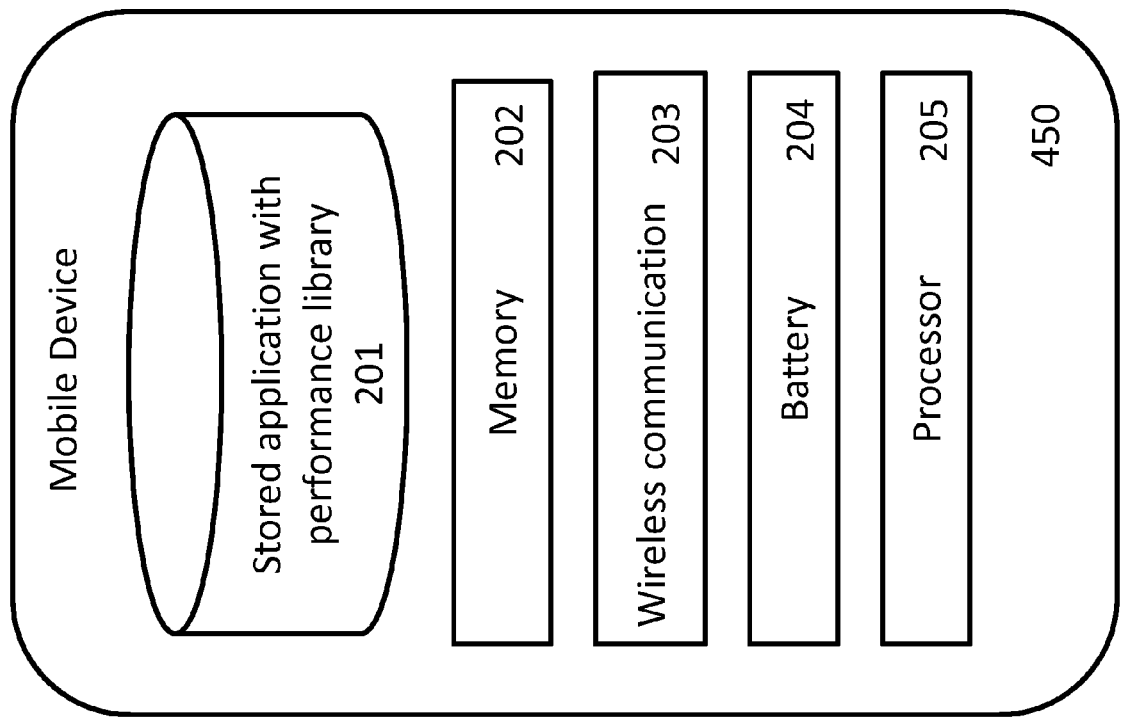
FIG. 2 illustrates the mobile device and its relevant components including an application with a performance library that collects processor, memory, battery, and network performance information.

FIG. 2 illustrates a mobile device 450 with storage that includes a mobile application with an included performance library 201. The performance library monitors the performance of the application, including use of memory 202, wireless communication 203, battery 204, and processor 205. The performance library is included in the mobile application by the developer 100, as described in FIG. 4. Those skilled in the art could develop such a performance library for mobile applications that is optimized to collect performance information without significantly slowing down the application that contains it. As examples, the performance library 201 can monitor per type of mobile device 450 the memory 202 allocated per function used by the mobile application, and the maximum memory 202 that is used by the application per user session relative to the total available memory per type of mobile device 450. The performance library 201 can also monitor the wireless communication 203 to measure the duration of network requests made from the application whose performance could be negatively affected by slow network connections, by large amounts of data that mobile users download, or by type of mobile device 450. The performance library 201 can monitor the amount that the application drains the battery 204 per type of mobile device 450 type. Plus the performance library 201 can monitor the processor 205 to measure the run-time per function call in the application per type of mobile device 450.

Figure 3:
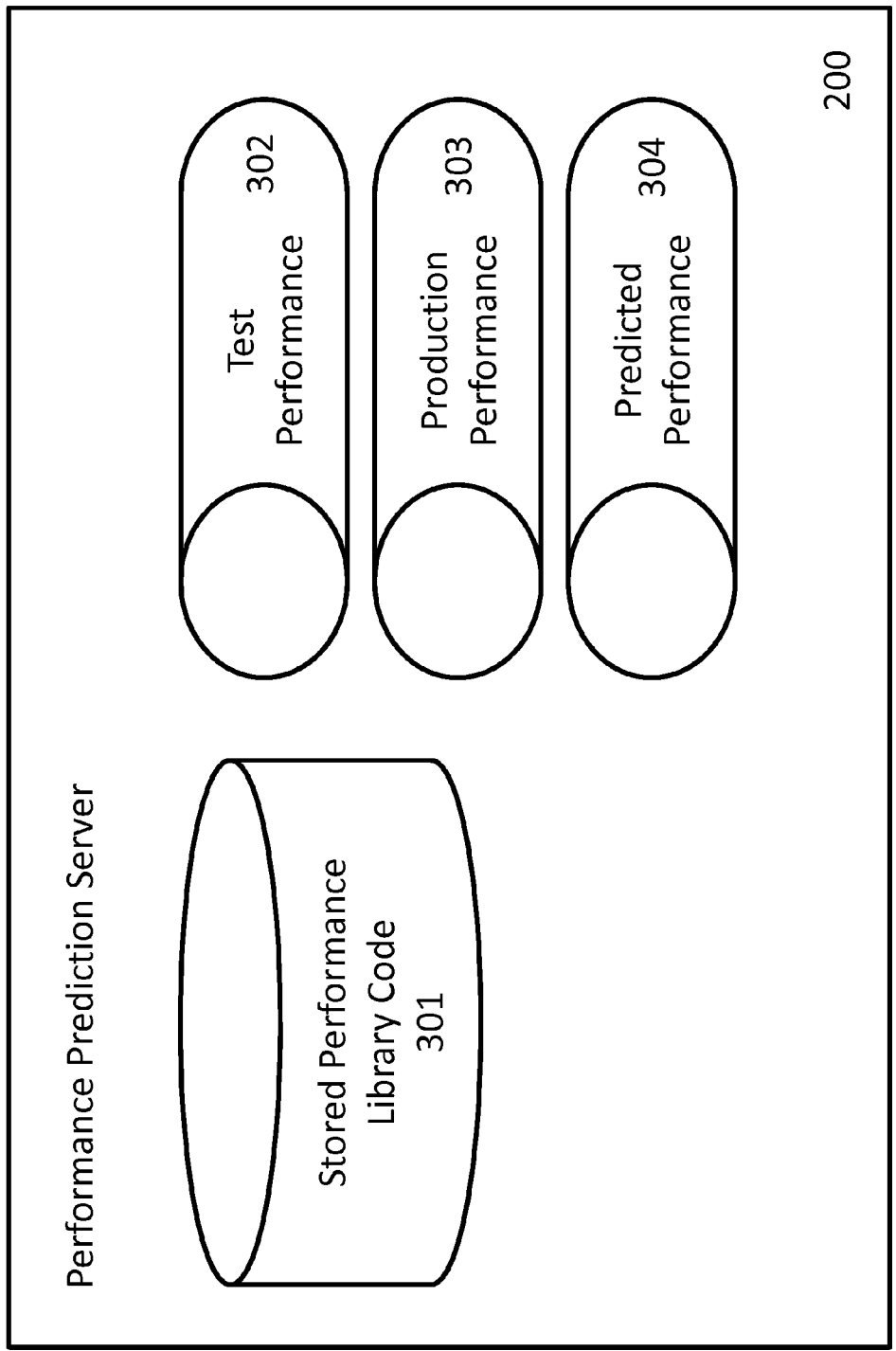
FIG. 3 illustrates the performance prediction server including the stored performance library code and its databases

FIG. 3 illustrates the makeup of the performance prediction server 200 which includes the performance library code in storage 301, a test performance 302 database to store data that is sent by mobile devices 450 in the test user group 400, a production performance 303 database to store data that is sent by mobile devices 450 in the production user group 400. The test performance 302 database and production performance 303 database store the application name that the performance data is collected for, the mobile device 450 type and operating system that data is collected on, plus performance measures associated with memory 202, wireless communication 203, battery 204, and processor 205 performance. The test performance 302 database also stores whether performance data was processed. Capturing of the test performance 302 data is described in FIG. 4. Capturing of the production performance 303 data is described in FIG. 6. In addition, a predicted performance 304 database stores predictions found by the performance prediction server 200 as described in FIG. 5. The predicted performance 304 database stores per application with performance data in the test performance 302 database a set of similar performing applications in the production performance 303 database and for each production application the specific performance data that matched, as an example the runtime of a specific function.

Figure 4:
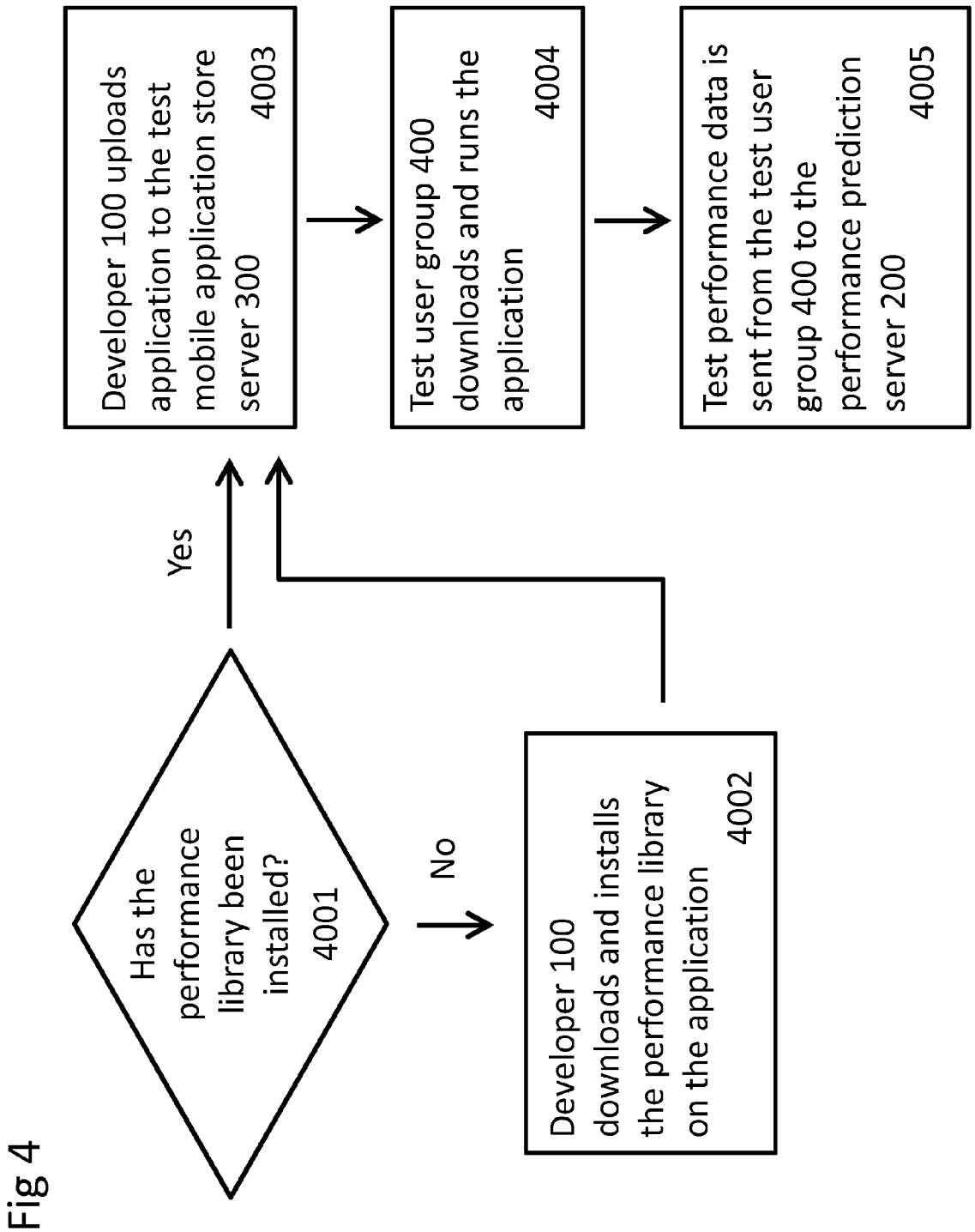
FIG. 4 shows how the performance library is installed in a mobile application, then how it is distributed and used by a test user group.

FIG. 4 shows how the performance library is installed in a mobile application, then how it is distributed and used by a test user group 400. In step 4001, the developer 100 checks if the performance library was installed on the mobile application. If not, then in step 4002 the developer 100 downloads the stored performance library code 301 from the performance prediction server 200 and installs the performance library in the mobile application. Those skilled in the art would know how to install a library in a mobile application. Then in step 4003, which is also reached if the performance library was already installed in the application, the developer 100 uploads the application to the test mobile application store server 300. In step 4004, members of the test user group 400 download over the network 500 the application onto their mobile device 450 from the test mobile application store server 300. In step 4005, after the test user group 400 executes the application on their mobile devices 450, the mobile devices 450 send to the performance prediction server 200 the test performance information collected by the performance library. The performance prediction server 200 then stores that data in the test performance 302 database. The data can either be sent in batches periodically or can be sent in real-time as it is collected.

Figure 5:
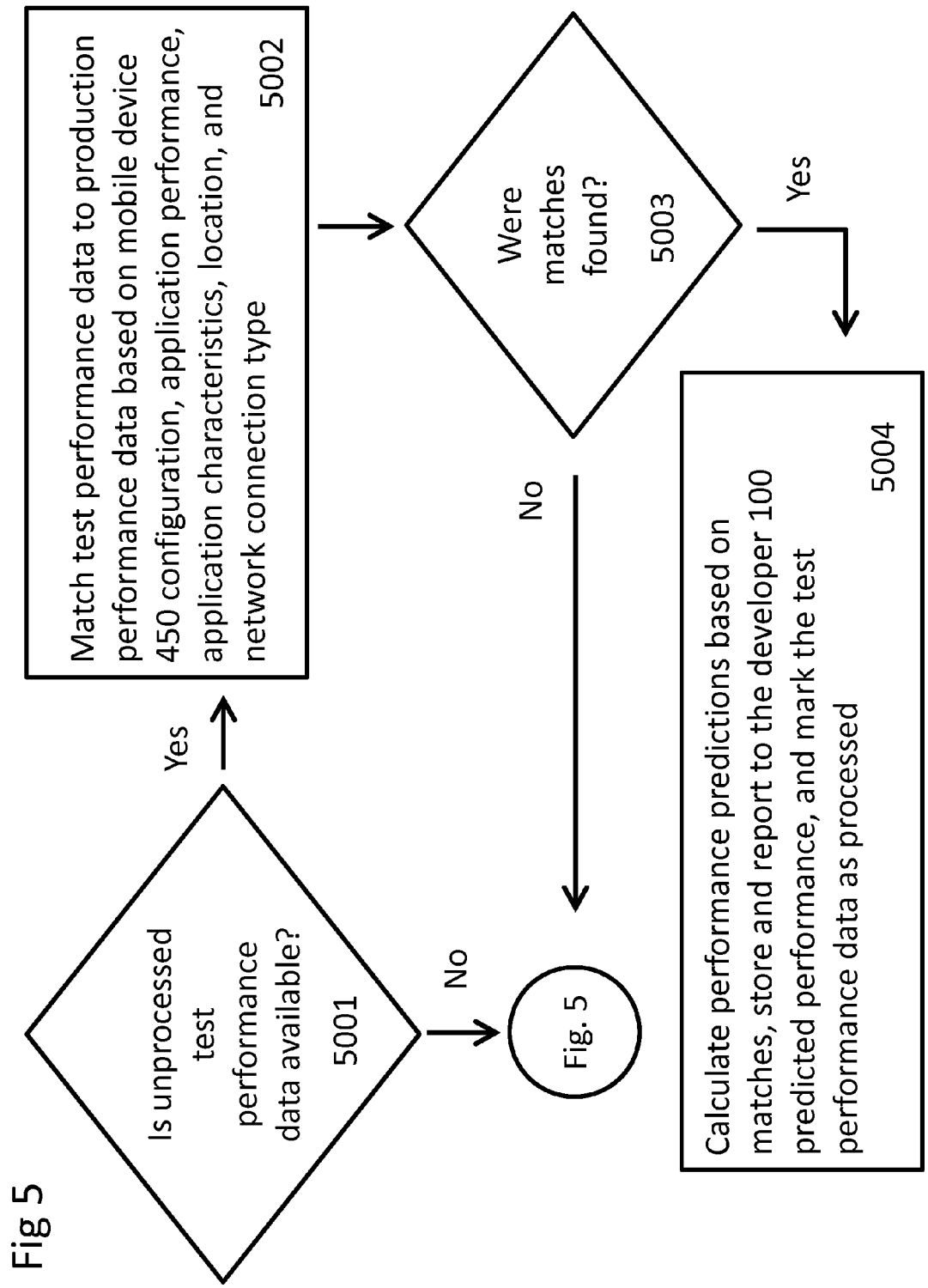
FIG. 5 shows how the performance prediction server makes predictions based on test performance data and historical production performance data.

FIG. 5 describes a how the performance prediction server 200 makes prediction about how an application run on mobile devices 450 by the test user group 400 will perform on mobile devices 450 used by the production user group 410. In step 5001 the performance prediction server 200 checks if there is an application that is flagged as having unprocessed test performance data in the test performance 302 database. If not then the performance prediction server 200 repeats step 5001, optionally after waiting a fixed amount of time, otherwise in step 5002, the performance prediction server 200 matches the unprocessed test performance data of an application in the test performance 302 database to production performance data in the production performance 303 database based on mobile device 450 configuration, application performance, or application characteristics.

In one example processor and memory performance is matched based on mobile device 450 configuration. If the test performance 302 data was captured on a Samsung Galaxy S III mobile device 450 running version 2.1 of the Android operating system, then the performance prediction server 200 would look for production performance 303 data for the same mobile device 450 type and operating system version.

In another example battery performance is matched based on mobile device 450 configuration, application performance, and application characteristics. If the test performance 302 data for an application was captured on a Samsung Galaxy S III mobile device 450 running version 3.2 of the Android operating system, with the Wi-Fi and Bluetooth services turned on, with the battery draining at 7% per hour, and the application using the GPU about equally compared to the CPU, plus using the GPS about once a minute, then the performance prediction server 200 would try to match production performance 303 data with similar characteristics. Alternatively battery performance could be matched based on less data, for example mobile device 450 configuration only.

In yet another example network performance could be matched based on location and connection type. If the test performance 302 data for an application were captured in Atlanta, Ga. using the Verizon Wireless CDMA network, or using a Comcast connection over Wi-Fi, then the performance prediction server 200 would match production performance 303 data with the same location and connection type.

In step 5003 if no matching production performance data is found in the production performance 303 database that is a sufficiently close match to the performance of an application with unprocessed test performance data from the test performance 302 database, then the performance prediction server 200 repeats step 5001, optionally after waiting a fixed amount of time, otherwise in step 5004, the performance prediction server 200 makes performance predictions, as described below, the performance predictions are stored in the predicted performance 304 database and sent to the mobile application developer computer 100 over the network 500; plus the performance prediction server 200 marks the unprocessed test performance data in the test performance 302 database as processed. The predicted performance sent by the performance prediction server 200 can be viewed on the mobile application developer computer 100 by programs like an email application or browser application.

Below are examples of performance predictions that can be made (e.g. in step 5004). In certain examples, after test performance 302 data, including memory 202, wireless communication 203, battery 204, or processor 205 performance data, is matched with similar production performance 303 data, in step 5002, then performance predictions are made by finding the relative performance, or ratio, between the matched production performance and production performance of other mobile device 450 configurations, locations, and connection types found in the production performance 303 database. The discovered ratio is then used as a multiplier for the test performance 302 data. As an illustration if the test performance is X units and the matched production performance is Y units, and an alternate mobile device 450 configuration has a production performance of 2Y units, then the ratio is Y:2Y, or 1:2, and the predicted test performance is 2X units for the alternate mobile device 450 type.

As an example if the processor test performance data showed an average of 100 milliseconds for a specific function call made in an application and matching data was found in step 5002 for production performance data that uses the same mobile device 450 configuration, say a Samsung Galaxy S III mobile devices 450 running version 2.1, then the performance prediction server 200 could predict performance on other mobile device 450 configurations, say on HTC Evo 4G mobile devices 450 running version 3.2 of the Android operating system. Specifically if the production performance data shows a 200 millisecond average runtime for the Samsung configuration and 100 milliseconds average runtime for the HTC configuration, that is a 2:1 ratio between the Samsung and HTC configurations, then a prediction could be made for the test application running on the HTC configuration that it will take 50 milliseconds based on this 2:1 performance ratio.

In another example if the memory performance test data showed the average peak memory used as 70% of available memory and matching data was found in step 5002 for production performance data that uses the same mobile device 450 configuration, say Samsung Galaxy S III mobile devices 450 running version 2.1, then predictions could be made about out-of-memory occurrences for other mobile device 450 configurations, say HTC Evo 4G mobile devices 450 running version 2.1 of the Android operating system. Specifically if the production performance data showed the use of memory between the Samsung and HTC configurations to be a 1:1 ratio and if the HTC configuration has half the available memory, then the performance prediction server 200 could predict a high frequency of out-of-memory occurrences for the test application on the HTC configuration.

In another example if the memory performance test data showed the average peak memory of 110 MB and matching data was found in step 5002 for production performance data that uses the same mobile device 450 configuration, say Samsung Galaxy S III mobile devices 450 running version 2.1, then predictions could be made about out-of-memory termination occurrences for other mobile device 450 configurations, say HTC Evo 4G mobile devices 450 running version 2.1 of the Android operating system. Specifically if the production performance data showed the use of memory between the Samsung and HTC configurations to be a 1:1 ratio and if the HTC configuration has half the available memory, then the performance prediction server 200 could predict a high frequency of out-of-memory occurrences for the test application on the HTC configuration.

In another example, the production performance data may show a particular performance (e.g. frequency of out-of-memory occurrences) for a given available memory capacity. This information could then be used to predict performance for a modified mobile application running on mobile device configurations having multiple different available memory capacities.

In yet another example if battery performance test data showed an average battery drain of 7% per hour and matching data was found in step 5002 for production performance data that uses the same mobile device 450 configuration, with similar application performance and application characteristics, say Samsung Galaxy S III mobile devices 450 running version 2.1, with the Wi-Fi and Bluetooth services turned on, and the application using the GPU about equally compared to the CPU, plus accessing the network about once a minute, then predictions could be made about the battery performance of other mobile device 450 configurations, say HTC Evo 4G mobile devices 450 running version 2.1 of the Android operating system, with the Wi-Fi and Bluetooth services turned on. Specifically if the production performance data showed the rate of battery drainage between the Samsung and HTC configurations to be a 1:2 then the performance prediction server 200 could predict a the rate of battery drainage for the test application on the HTC configuration to be 14%.

In another example if the network performance test data showed http average downloading latency of 300 milliseconds and matching data was found in step 5002 for production performance data that uses the same mobile device 450 configuration, location, and connection type, say Samsung Galaxy S III mobile devices 450 running version 2.1, in West Windsor, N.J., on the Sprint CDMA mobile network, then predictions could be made about network performance of that mobile device 450 configuration for other locations and connection types, say the same Samsung configuration running in Dublin, Calif. on the AT&T GSM mobile network. Specifically if the production performance data showed the rate of network performance between Sprint in West Windsor, N.J. and AT&T in Dublin, Calif. to be a 1:1 ratio on the Samsung configuration then the performance prediction server 200 could predict a the network performance for the test application on the AT&T network to be 300 milliseconds as well.

In another example if the network errors test data showed a 5% network error rate, either HTTP error or connection error, and matching data was found in step 5002 for production performance data that uses the same mobile device 450 configuration, say Samsung Galaxy S III mobile devices 450 running version 2.1, then predictions could be made about network error occurrences for other mobile device 450 configurations, say HTC Evo 4G mobile devices 450 running version 2.1 of the Android operating system. Specifically if the production performance data showed the network error rate between the Samsung and HTC configurations to be a 1:1 ratio then the performance prediction server 200 could predict a 5% error rate for the test application on the HTC configuration.

In another example if the frame rate test data showed a low frame rate, say 10 or less frames per second, for 5% of the session time, and matching data was found in step 5002 for production performance data that uses the same mobile device 450 configuration, say Samsung Galaxy S III mobile devices 450 running version 2.1, then predictions could be made about low frame rate occurrences for other mobile device 450 configurations, say HTC Evo 4G mobile devices 450 running version 2.1 of the Android operating system. Specifically if the production performance data showed the low frame rate occurrences between the Samsung and HTC configurations to be a 1:1 ratio then the performance prediction server 200 could predict a low frame rate for 5% of the session time for the test application on the HTC configuration.

In another example if the network performance test data showed a latency of 900 milliseconds to establish a connection and matching data was found in step 5002 for production performance data that uses the same mobile device 450 configuration, location, and connection type, say Samsung Galaxy S III mobile devices 450 running version 2.1, in West Windsor, N.J., on the Sprint CDMA mobile network, then predictions could be made about latency for establishing a connection of that mobile device 450 configuration for other locations and connection types, say the same Samsung configuration running in Dublin, Calif. on the AT&T GSM mobile network. Specifically if the production performance data showed the rate of network performance between Sprint in West Windsor, N.J. and AT&T in Dublin, Calif. to be a 1:1 ratio on the Samsung configuration then the performance prediction server 200 could predict a the latency for establishing a connection for the test application on the AT&T network to be 300 milliseconds as well.

In another example, predicting performance can include determining a distribution of outcomes (e.g. a histogram) for a parameter of the network performance test data. This distribution can then be used together with matching data to predict outcomes for a parameter of the modified mobile application.

In another example instead of using a linear performance function, a non-linear performance function can be used to calculate a performance prediction. As an illustration if the test performance is exp(X) units, or the exponent of X which is a non-linear function used to model performance, and the matched production performance is exp(Y) units, and an alternate mobile device 450 configuration has a production performance of exp(2Y) units, then it follows that the predicted test performance is exp(2X) units for the alternate mobile device 450 type.

In another example if the memory performance test data showed out-of-memory terminations occurring for 5% of sessions, where the operating system shuts down an application for using too much memory, and matching data was found in step 5002 for production performance data that uses the same mobile device 450 configuration, say Samsung Galaxy S III mobile devices 450 running version 2.1, then predictions could be made about out-of-memory termination occurrences for other mobile device 450 configurations, say HTC Evo 4G mobile devices 450 running version 2.1 of the Android operating system. Specifically if the production performance data showed percent of sessions with out-of-memory terminations to be a 1:2 ratio between the Samsung and HTC configurations, then the performance prediction server 200 could predict that 10% of sessions will have out-of-memory terminations for the test application on the HTC configuration.

In another example if the memory performance test data showed memory warnings by the operating system occurring for 10% of sessions (e.g. warning that an application is using too much memory), and matching data was found in step 5002 for production performance data that uses the same mobile device 450 configuration, say Samsung Galaxy S III mobile devices 450 running version 2.1, then predictions could be made about memory warning occurrences for other mobile device 450 configurations, say HTC Evo 4G mobile devices 450 running version 2.1 of the Android operating system. Specifically if the production performance data showed percent of sessions with memory warnings to be a 1:2 ratio between the Samsung and HTC configurations, then the performance prediction server 200 could predict that 20% of sessions will have memory warnings for the test application on the HTC configuration.

In another example size of downloaded payload is used to predict latency. Specifically if a test application has an average download payload of 100 MB and a matching production application with an average download payload of 100 MB has a 3.2 seconds latency for the download, then the test application could be predicted to have 3.2 seconds of latency for the download. This type of prediction could be made for a specific geography, connection type, or carrier.

In accordance with the above-described examples, a performance parameter is predicted for a particular environment or device configuration that was not specifically tested in the test group (e.g. a network error rate is predicted for HTC type mobile devices based at least in part on network error rate observed for Samsung devices).

In other examples, a performance parameter is predicted based at least in part on a different performance parameter (e.g. memory termination frequency is predicted based in part on observed average peak memory usage). Performance predictions can be made by obtaining a certain type of observed performance data for test application and matching it to the same type of performance data for a production application, then inferring performance of the test application based at least in part on another type of data collected for the matched production application. For example, if the test data indicates the average peak memory used, but does not indicate percent of sessions with memory terminations, and the production data indicates both average peak memory used and percent of sessions with memory terminations, then percent of memory terminations can be predicted for the test data by matching it to production data. Specifically if a test application has average peak memory usage of 110 MB, and if a matching production application which also average peak memory usage of 110 MB has 5% of sessions experiencing memory terminations, then the test application can be predicted to have 5% of its sessions experiencing memory terminations. This type of prediction can optionally be made for a specific handset type or operating system version.

In another example the prediction can be made using multiple types of data to match between test data and production data. For example not only is peak memory used but also percent of sessions with memory warnings are used to match to production data and predict percent of sessions with memory terminations.

In accordance with an embodiment, the test data is captured using other means than the performance library. For example, Apple's Instruments can be used to capture the average peak memory or other performance metrics for a test application. In this case, the test data can be matched to production data captured using the performance library.

In accordance with an embodiment, rather than making predictions for an exhaustive list of mobile device 450 configurations, locations, and network connection types, the most popular ones could be calculated, or ones requested by the mobile application developer 100.

In accordance with an embodiment the predicted data is based on data from an older version of the application as opposed to all applications that have data in the production performance 310 database.

In accordance with an embodiment predictions are given different statistical confidence levels depending on the amount of test data collected.

Figure 6:
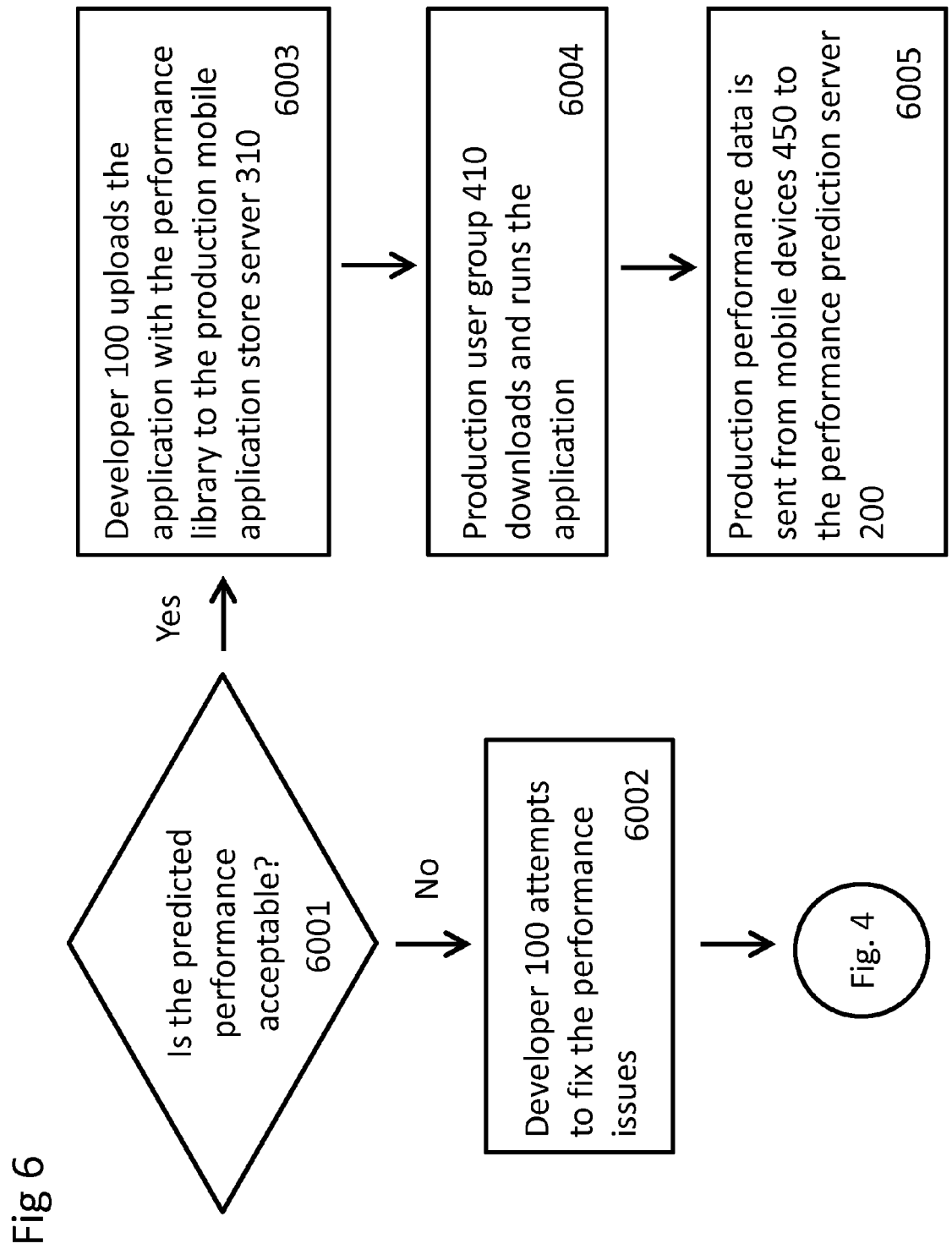
FIG. 6 shows how a mobile application is distributed to production user group if the predicted performance is acceptable.

FIG. 6 illustrates how a mobile application is distributed to the production user group 410 if the predicted performance is acceptable. In step 6001 the developer 100 determines if the predicted performance provided by the performance prediction server 200 in step 5004 is acceptable. If not then in step 6002 the developer 100 modifies the application in an attempt to improve the performance of the application and then repeats the steps in FIG. 4; otherwise in step 6003 the developer 100 uploads the application with the performance library to the production mobile application store server 310. Then in step 6004 the production user group 410 downloads the application from the production mobile application store server 310 and run the application on their mobile devices 450. In step 6005 the performance data collected by the performance library installed within the application is sent over the network 500 to the performance prediction server 200 and is stored in the production performance 303 database.

Figure 7:
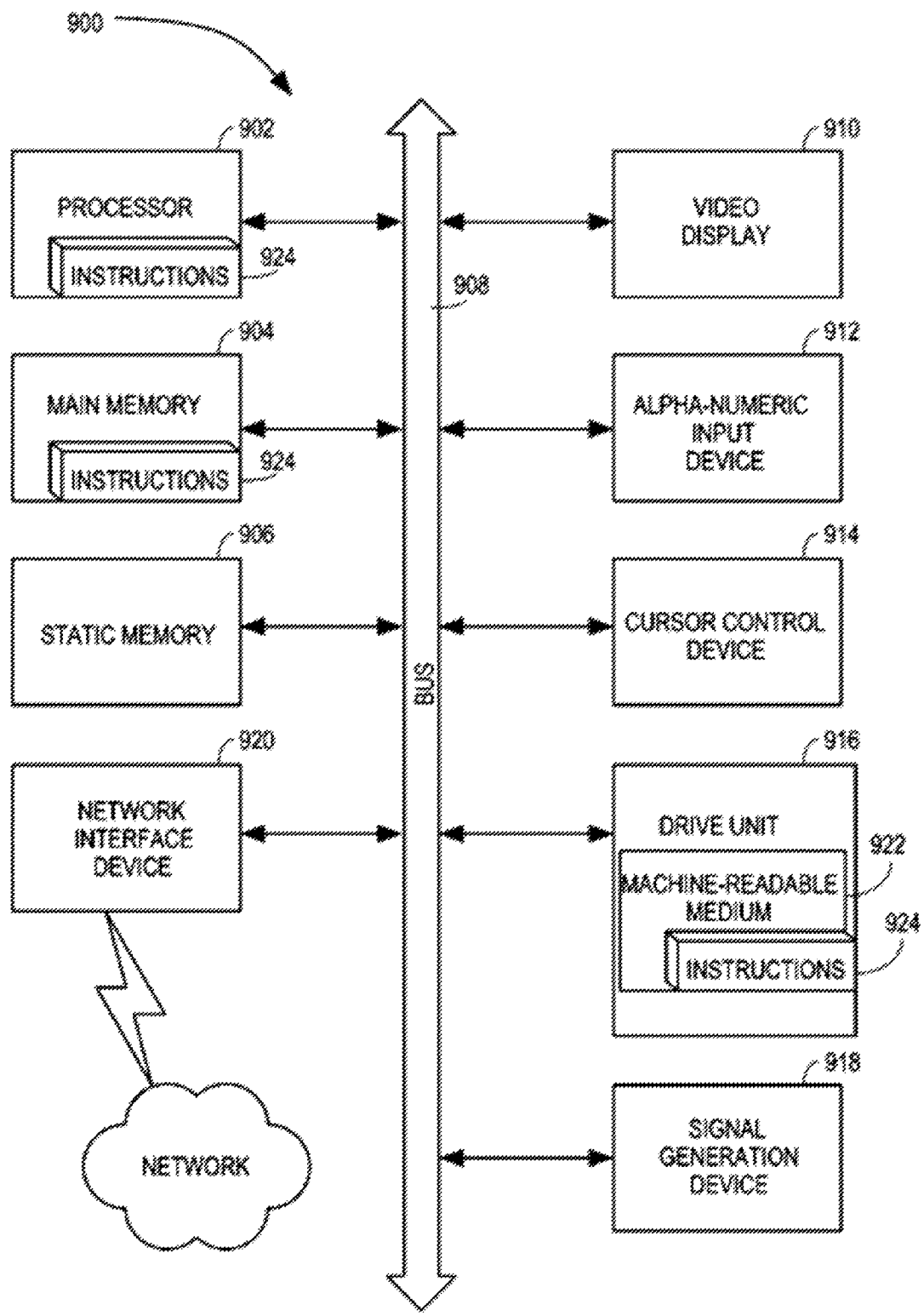
FIG. 7 is a block diagram of a machine in the form of a computer system that may form a server forming part of the network system

FIG. 7 shows a machine 900 in the exemplary form of the server or a personal computer as hereinbefore described within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 900 includes a processor 902 (e.g., a central processing unit (CPU), a graphics processing unit (GPU) or both), a main memory 904 (e.g., read only memory (ROM), flash memory, dynamic random access memory (DRAM) such as synchronous DRAM (SDRAM) or Rambus DRAM (RDRAM), etc.), and a static memory 906 (e.g., flash memory, static random access memory (SRAM), etc.), which communicate with each other via a bus 908.

The computer system 900 may further include a video display 910 (e.g., a liquid crystal display (LCD) or a cathode ray tube (CRT)). The computer system 900 also includes an alpha-numeric input device 912 (e.g., a keyboard), a cursor control device 914 (e.g., a mouse), a disk drive unit 916, a signal generation device 918 (e.g., a speaker), and a network interface device 920.

The disk drive unit 916 includes a machine-readable medium 922 on which is stored one or more sets of instructions 924 (e.g., software) embodying any one or more of the methodologies or functions described herein. The software may also reside, completely or at least partially, within the main memory 904 and/or within the processor 902 during execution thereof by the computer system 900, the main memory 904 and the processor 902 also constituting machine-readable media.

The software may further be transmitted or received over a network 928 via the network interface device 920.

While the machine-readable medium 924 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the present invention. The term "machine-readable medium" shall accordingly be taken to include, but not be limited to, solid-state memories, and optical and magnetic media.

It should be understood that "computer system" as used herein can comprise a single computer or multiple computers that are connected to one another over a network.

While certain representative embodiments and details have been shown for purposes of illustrating the invention, it will be apparent to those skilled in the art that various changes in the methods and apparatus disclosed herein may be made without departing from the scope of the invention which is defined in the appended claims.

What is claimed is:

1. A method of predicting performance of a mobile application comprising:
   facilitating installation of a first mobile application on a first plurality of mobile device combinations comprising disparate combinations of mobile device configurations and wireless network connection types;
   collecting performance data resulting from operating the first mobile application on the first plurality of mobile device combinations, the performance data representing performance of the first mobile application for each respective disparate combination of the first plurality of mobile device combinations;
   facilitating installation of a second mobile application on a second plurality of mobile device combinations comprising disparate combinations of mobile device configurations and wireless network connection types, the second plurality of mobile device combinations being a smaller set of combinations than the first plurality of mobile device combinations;

collecting test data resulting from operating the second mobile application on the second plurality of mobile device combinations, the test data representing performance of the second mobile application for each respective disparate combination of the second plurality of mobile device combinations; and predicting performance of the second mobile application on a first mobile device with a disparate combination of a mobile device configuration and a wireless network connection type that is not represented by the second plurality of mobile device combinations by:

obtaining, from the test data, a subset of test data associated with operating the second mobile application on a second mobile device with a disparate combination of a mobile device configuration and wireless network connection type that is represented by the second plurality of mobile device combinations;

obtaining a first set of performance data of the first mobile application operating on the second mobile device from the performance data;

obtaining a second set of performance data of the first mobile application operating on the first mobile device from the performance data;

generating a relative performance using the first set of performance data and the second set of performance data; and predicting performance of the second mobile application on the first mobile device by mathematically applying the relative performance to at least some of the subset of test data.

2. The method according to claim 1, wherein the second mobile application is a modified version of the first mobile application.

3. The method according to claim 1, wherein each of the mobile device configurations comprises a handset type and an operating system type.

4. The method according to claim 1, wherein each of the wireless connection types comprise Wi-Fi networks and cellular networks.

5. The method according to claim 1, wherein the first plurality of mobile device combinations further comprises disparate combinations of mobile device configurations, wireless network connection types, and geographical locations.

6. The method according to claim 1, wherein the performance of the first mobile application represented by the performance data comprises one or more of: duration of network requests; battery drain; memory usage quantity; downloading latency; and runtime per function call.

7. The method according to claim 1, wherein the performance of the first mobile application represented by the performance data comprises one or more of: low frame rate occurrences, network error occurrences and memory termination occurrences.

8. The method according to claim 1, wherein said predicting performance comprises matching parameters of the collected performance data with parameters of the collected test data.

9. The method according to claim 8, wherein said predicting performance further comprises predicting a value of a performance parameter for the second mobile application based on a value of a same performance parameter observed for the first mobile application.

10. The method according to claim 8, wherein the matched parameters comprise mobile device configuration.

11. The method according to claim 8 wherein the matched parameters comprise wireless network connection type.

12. The method according to claim 8, wherein the matched parameters comprise geographical location.

13. The method according to claim 8, wherein the matched parameters comprise parameters other than available memory capacity and wherein said predicting performance comprises predicting performance for mobile device configurations having multiple different available memory capacities.

14. The method according to claim 8, wherein said predicting performance further comprises determining a non-linear performance function from parameters of the performance test data and applying the non-linear performance function to a parameter of the collected test data.

15. The method according to claim 8, wherein said predicting performance further comprises determining a distribution of outcomes for a parameter of the performance test data and using the distribution to predict outcomes for a parameter of the collected test data.

16. The method according to claim 15, wherein the distribution of outcomes comprises a histogram.

17. The method according to claim 8, wherein said predicting performance further comprises predicting a value of a first performance parameter for the second mobile application based on a value of a second performance parameter observed for the first mobile application, wherein the second performance parameter is different from the first performance parameter.

18. The method according to claim 17, wherein the matched parameters comprise the second performance parameter.

19. The method according to claim 1, further comprising distributing the second mobile application to a group of wireless mobile devices if the predicted performance of the second mobile application is satisfactory and, otherwise, developing a third mobile application by modifying the second mobile application.

20. The method according to claim 19, further comprising:

installing the third mobile application on a third plurality of mobile device combinations;

collecting test data resulting from operating the third mobile application on the third plurality of mobile device combinations; and predicting performance of the third mobile application using the performance data resulting from operating the first mobile application on the first plurality of mobile device combinations, and the test data resulting from operating the third mobile application on the third plurality of mobile device combinations.

21. The method according to claim 1, further comprising predicting a plurality of performance parameters; and assigning different statistical confidence levels to the predicted performance parameters of the plurality of performance parameters.

22. The method according to claim 1, wherein the first and second mobile applications comprise a performance library that monitors performance of the application.

23. A system for predicting performance of a mobile application comprising a performance prediction server configured to:

receive performance data resulting from operating a first mobile application on a first plurality of mobile device combinations comprising disparate combinations of mobile device configurations and wireless network connection types, the performance data representing performance of the first mobile application for each respective disparate combination of the first plurality of mobile device combinations;

receive test data resulting from operating a second mobile application on a second plurality of mobile device combinations, the second plurality of mobile device combinations being a smaller set than the first plurality of mobile device combinations, the second plurality of mobile device combinations comprising disparate combinations of mobile device configurations and wireless network connection types, the test data representing performance of the second mobile application for each respective disparate combination of the second plurality of mobile device combinations; and predict performance of the second mobile application on a first mobile device with a disparate combination of a mobile device configuration and a wireless network connection type that is not represented by the second plurality of mobile device combinations by:

obtaining, from the test data, a subset of test data associated with operating the second mobile application on a second mobile device with a disparate combination of a mobile device configuration and wireless network connection type that is represented by the second plurality of mobile device combinations;

obtaining a first set of performance data of the first mobile application operating on the second mobile device from the performance data;

obtaining a second set of performance data of the first mobile application operating on the first mobile device from the performance data;

generating a relative performance using the first set of performance data and the second performance data; and predicting performance of the second mobile application on the first mobile device by mathematically applying the relative performance to at least some of the subset of test data.

24. A non-transitory machine-readable storage medium having stored thereon instructions which, when executed, cause a computing device to perform a method of predicting performance of a mobile application comprising:

collecting performance data resulting from operating a first mobile application on a first plurality of mobile device combinations comprising disparate combinations of mobile device configurations and wireless network connection types, the performance data representing performance of the first mobile application for each respective disparate combination of the first plurality of mobile device combinations;

collecting test data resulting from operating a second mobile application on a second plurality of mobile device combinations, the second plurality of mobile device combinations being a smaller set than the first plurality of mobile device combinations, the second plurality of mobile device combinations comprising disparate combinations of mobile device configurations and wireless network connection types, the test data representing performance of the second mobile application for each respective disparate combination of the second plurality mobile device combinations; and predicting performance of the second mobile application on a first mobile device having a disparate combination of a mobile device configuration and a wireless network connection type that is not represented by the second plurality of mobile device combinations by:

obtaining, from the test data, a subset of test data associated with operating the second mobile application on a second mobile device with a disparate combination of a mobile device configuration and wireless network connection type that is represented by the second plurality of mobile device combinations;

obtaining a first set of performance data of the first mobile application operating on the second mobile device from the performance data;

obtaining a second set of performance data of the first mobile application operating on the first mobile from the performance data;

generating a relative performance using the first set of performance data and the second set of performance data; and predicting performance of the second mobile application on the first mobile device by mathematically applying the relative performance to at least some of the subset of test data.

\* \* \* \* \*